Sept. 19, 1933.     W. L. LOFTHOUSE     1,927,570
ELECTRIC SOLDERING IRON
Filed June 26, 1929     3 Sheets-Sheet 1
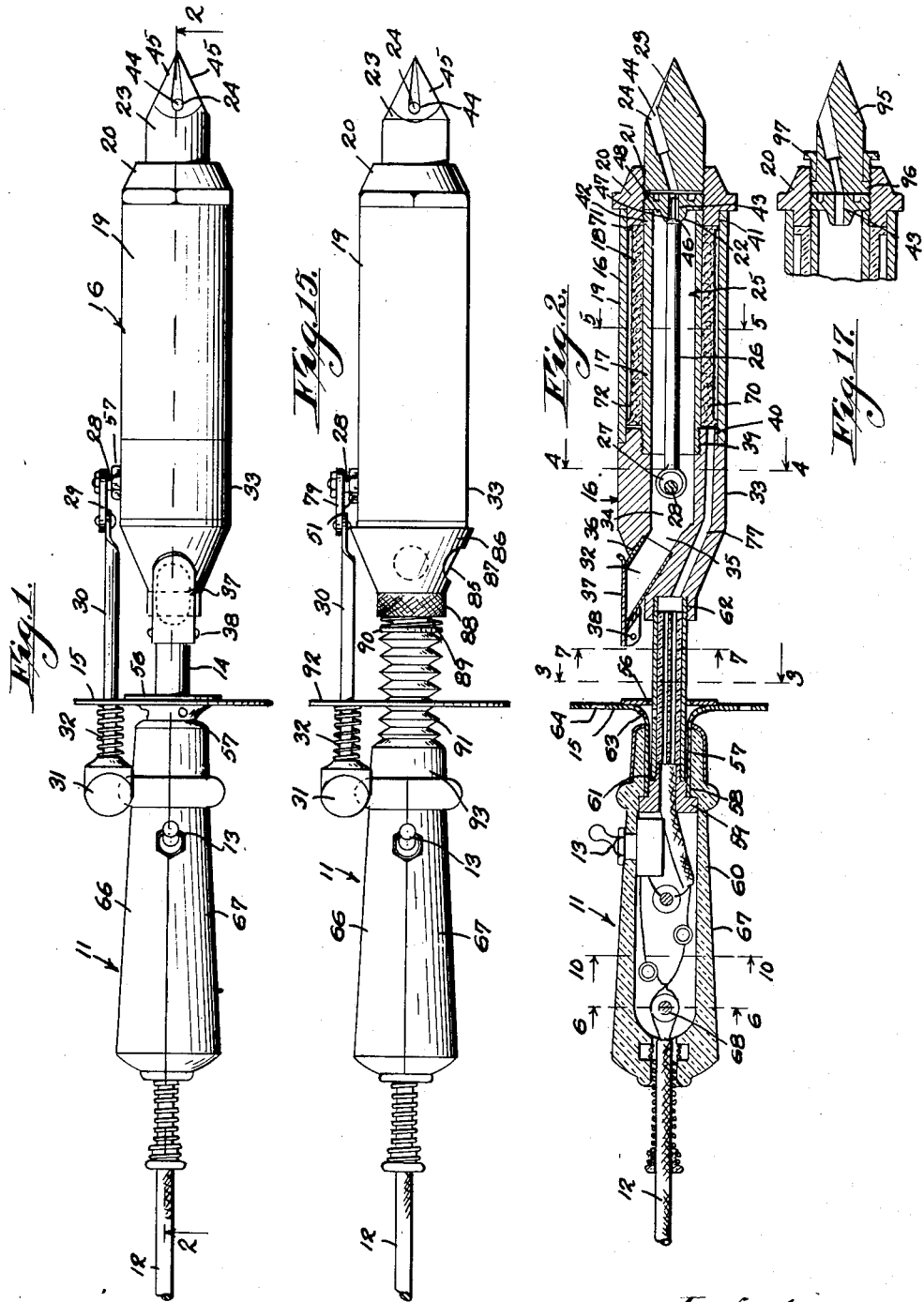
Inventor:
W. L. Lofthouse.
by Hazard and Miller
Attorneys.

Sept. 19, 1933.  W. L. LOFTHOUSE  1,927,570
ELECTRIC SOLDERING IRON
Filed June 26, 1929   3 Sheets-Sheet 2

Inventor
W. L. Lofthouse
by Hazard and Miller
Attorneys

Sept. 19, 1933.   W. L. LOFTHOUSE   1,927,570
ELECTRIC SOLDERING IRON
Filed June 26, 1929   3 Sheets-Sheet 3

Inventor
W. L. Lofthouse.
by Hazard and Miller
Attorneys

Patented Sept. 19, 1933

1,927,570

UNITED STATES PATENT OFFICE 1,927,570

ELECTRIC SOLDERING IRON

William L. Lofthouse, Los Angeles, Calif.

Application June 26, 1929. Serial No. 373,794

23 Claims. (Cl. 219—27)

My invention pertains to electric soldering irons in which the solder is melted by heat derived from electric current, the heating elements being adjacent a solder reservoir.

An object of my invention is the construction of an electric soldering iron with a reservoir for solder adjacent the point and having the electric heating elements surrounding this reservoir with a spacing between the reservoir and the handle, whereby the handle may be kept cool having an electric switch controlling the heating elements in the handle and also a control for a valve adjacent the handle, there being an opening for filling solid solder into the reservoir.

Another object of my invention pertains to the valve construction, and means for actuating the valve and in this the valve is formed with a raised seat whereby the dross and the like from the solder will not clog or close the seat and having a valve stem which is manipulated by an eccentric or the like; this eccentric being controlled by a transverse shaft operated by a crank and link on the outside of the soldering iron.

In this connection a more detailed object of my invention is forming the valve stem with a somewhat semi-spherical end having a projecting tongue, the semi-spherical end being adapted to bear on the rounded edge of the valve seat and thereby form a closure, even should the stem be tilted slightly in regard to the valve seat.

Another object of my invention is forming the point of the soldering iron as a separate removable unit which may be threaded into a nut-like device; this nut-like device forming a holder for a second nut for a screw threaded plug having the valve seat and there being a passage through the point to carry the solder to one side of the point from the solder reservoir.

Another detailed object of my invention to simple the construction is in mounting the shaft having the cam to operate the valve stem in a solid body structure forming the upper part of the solder reservoir with the feed for the solder entering through said body structure and the nut holding the point are connected by an inner tube forming the inside of the solder reservoir and an outer cylinder, there being the electric heating elements between the tube and the cylinder.

Another feature of my invention is in the form of the electric heating unit, this being a spool of refractory material fitted on the tube forming the interior of the solder reservoir and the exterior cylinder. This refractory material is wound with the wires having a reverse turn at the lower end of the spool, this turn being secured to one end of the refractory spool. The wires are wound parallel and both leads pass out from the upper end of the spool through a passage in the body structure through a neck into the handle where the switch is located.

Another feature of my invention comprises a heat disseminating plate secured to the neck of the soldering iron between the body structure and the handle, this forming a heat radiating fin and also having a tubular air space for ventilation on the handle side of this plate.

My invention in some respects may be considered as an improvement on my patent application Serial No. 241,811 filed December 22, 1927, renewed April 1, 1929.

My invention is illustrated in the accompanying drawings, in which:

Figure 1 is a plan view of my soldering iron;

Fig. 2 is a longitudinal section on the line 2—2 of Fig. 1 in the direction of the arrows;

Fig. 15 is a plan showing a modified construction;

Fig. 17 is a partial longitudinal section similar to Fig. 2, showing a different attachment for the soldering point.

Figure 3:
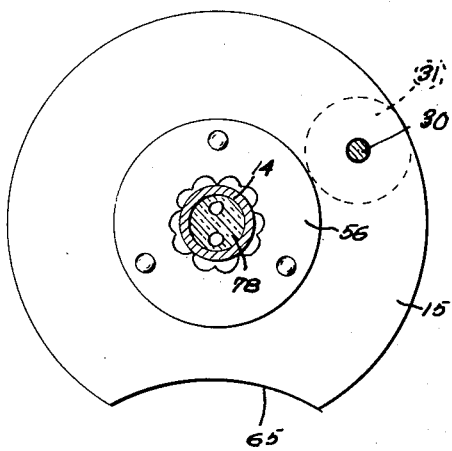
Fig. 3 is an enlarged transverse section on the line 3—3 of Fig. 2 in the direction of the arrows.
Figure 4:
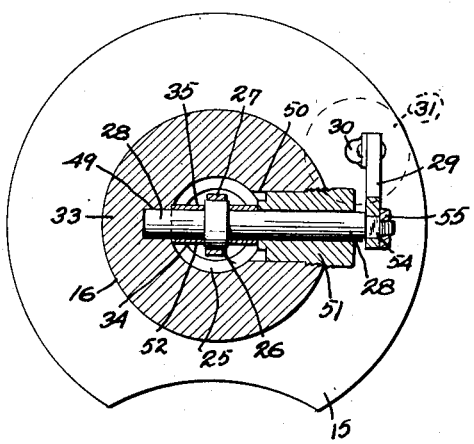
Fig. 4 is an enlarged transverse section on the line 4—4 of Fig. 2 in the direction of the arrows.
Figure 5:
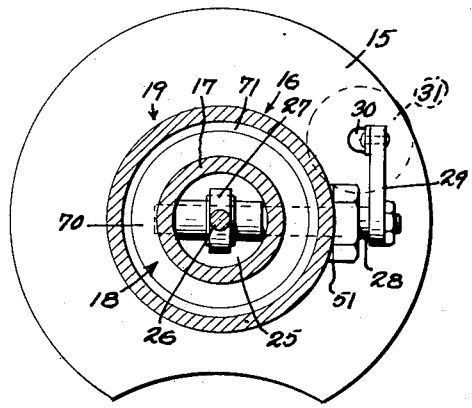
Fig. 5 is a section on the line 5—5 of Fig. 2 in the direction of the arrows, through the solder reservoir and showing the control of the dial stem.

Referring to the drawings, my soldering iron has a handle 11 with the electric lead wires 12 entering at one end. A switch 13 is utilized to open and close the circuit; a neck structure 14 connects to the handle, there being a heat disseminating plate 15 connected both to the neck and to the handle. The main body part of the iron 16 is attached to the neck and has an inner tube 17 connected thereto; this being surrounded by the electric heating spool 18 and on the outside there is a cylinder 19. The tube and the cylinder are connected to an end nut 20 in which is threaded a plug 21 having the valve seat 22.

A soldering point 23 is threaded into the nut 20 and has a duct 24 for the molten solder. There is a molten solder reservoir 25 inside of the tube 17 and the flow of the solder is controlled by the valve stem 26 operated by an eccentric 27 on the eccentric shaft 28. This latter has a crank 29 on the outside of the main body structure, the valve being operated by a link 30 which extends through a guide aperture in the plate 15 and has a thumb engaging end 31; there being a compression spring 32 between the thumb end 31 and the plate 15. The solder is fed into the reservoir through a solder passage 32.

In detail construction it will be seen that the body structure has a cylindrical section 33 with a central hollow bore 34. This bore has a lateral lead 35 with a tube 36 pressed therein and forming the passage 32. A cover 37 is connected by a hinge 38 to the tube 36, this being under spring tension to hold the cover closed. The lower end of the cylindrical portion 33 of the body structure has an internal thread 39 in which is threaded the tubing 17 and it has an external thread 40 on which is threaded the cylinder 19. The cylinder is threaded on the outside portion 41 of the nut 20 and the tube 17 on the internal threads 42 of this nut. The plug 21 is screwed in the nut 20 until it abuts against the tube 17. The point 23 is screw threaded in the nut 20 until the duct 24 for ejection of the solder registers with the solder passage 43 leading from the valve seat. It will be noted that this solder duct discharges at the orifice 44 on one of the pyramidal faces 45 of the solder point.

Some of the further details of construction embody the semi-spherical end 46 on the valve stem 26 which bears against the curved portion 47 of the valve seat 22 and it will be noted that there is an annular depression 48 surrounding the raised seat which allows the dross and the like to settle instead of passing through or clogging the seat. The semi-spherical end 46 of the stem allows a slight rocking of the stem on the seat and still gives a good closure.

The eccentric shaft 28 is mounted by having a small bore 49 in the interior of the cylindrical section 33 of the body portion 16 and a larger bore 50. Another type of bushing 51 is mounted in the larger bore, the eccentric shaft being journaled in the small bore 49 and in the bushing 51. A pair of sleeves 52 center the strap 5: connected to the stem on the eccentric 27. The crank 29 is mounted on a squared end 54 of the eccentric shaft and retained in place by a nut 55. The thumb engaging end 31 is preferably of heat resisting material so that it does not feel hot in the hand.

Figure 6:
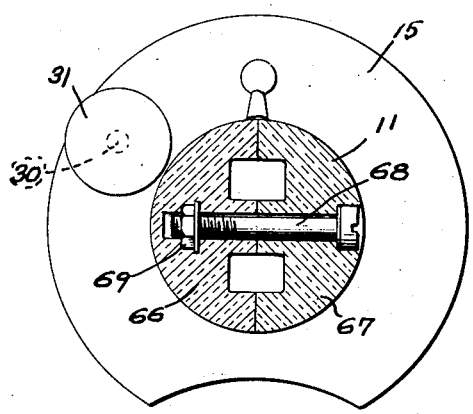
Fig. 6 is a transverse section on the line 6—6 of Fig. 2, through the handle.
Figure 7:
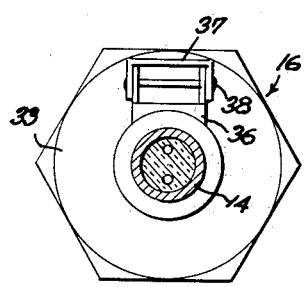
Fig. 7 is a transverse section on the line 7—7 of Fig. 2, in the direction of the arrows.

The plate 15 has a small plate 56 secured thereto, this small plate having a tight fit on the metal tube forming the neck 14 and a rearwardly extending tubular portion 57 extends backwardly from the plate 15 and is threaded on the threaded section 58 of the nut 59 which fits in the split handle 60. A smaller threaded section 61 has the tube forming the neck threaded thereon; this tube also being attached to an internally threaded section 62 of the body structure. There are air openings 63 in the base portion of the plate 15 allowing circulation of air between the tubular section 57 and the tube forming the neck 14. There are also a series of perforations 64 to facilitate dissemination of heat from the plate 15. There is also a notch 65 at the lower portion of this plate so that it may function as a stand. The handle 11 is formed in two sections 66 and 67 (see Fig. 6) with bolts 68 securing these sections together; each bolt being threaded into a nut 69 imbedded in the material of the handle.

The spool 18 has a refractory body 70 with flanges 71 at each end and with grooves 72 for the wires 73 and in one of the flanges there are a pair of perforations 74 with a loop of wire 75 extending through these perforations. Two portions of the wire are formed in a parallel helix and both ends extend outwardly through perforations 76 in the opposite flange. They lead through a passage 77 through the body portion and through an insulating sleeve 78 in the neck portion of the structure. The wires lead to the switch and through the hollow handle to the main wires 12. A wrench 79 having prongs 80 is utilized to thread the valve plug 21 in and out of the nut 20, there being sockets 81 to receive the prongs 80.

Figure 16:
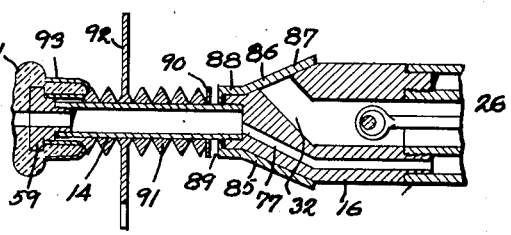
Fig. 16 is a longitudinal section through Fig. 15, on the line 16—16.
Figure 8:
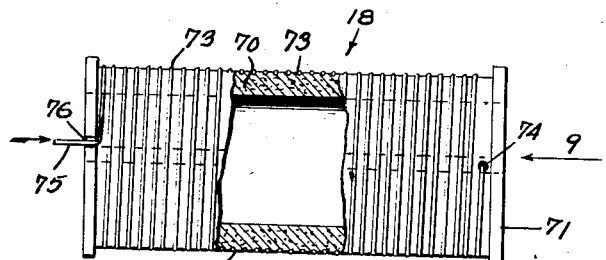
Fig. 8 is a side elevation partly broken away, showing the manner of winding the wires on the spool.
Figure 9:
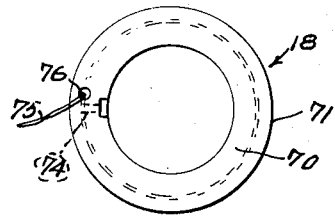
Fig. 9 is an end elevation taken in the direction of the arrow 9 of Fig. 8.
Figure 10:
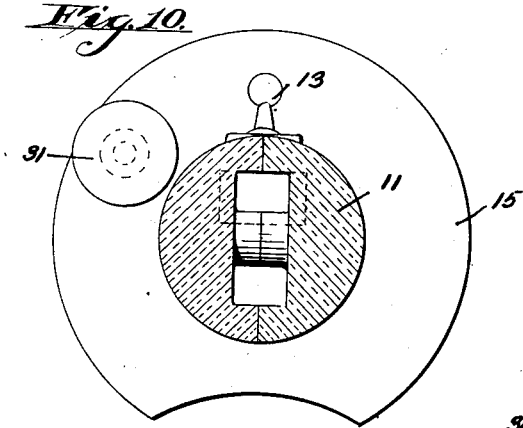
Fig. 10 is a transverse section on the line 10—10 of Fig. 2 in the direction of the arrows.
Figure 11:
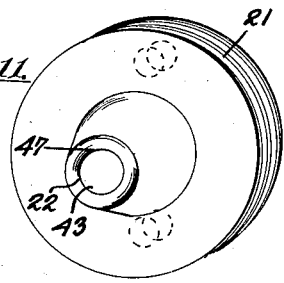
Fig. 11 is a perspective view of the plug having the valve seat, viewed from the inside.
Figure 12:
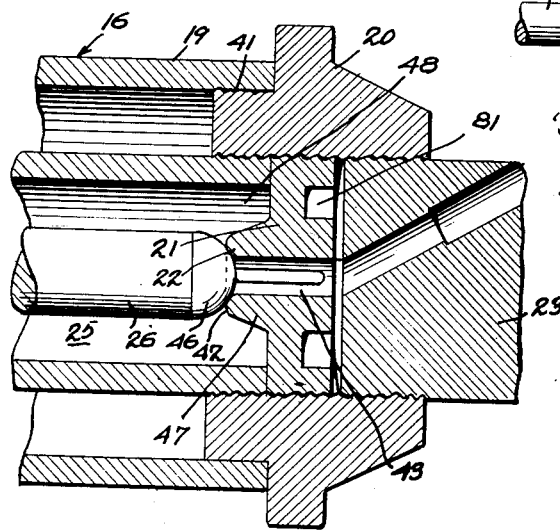
Fig. 12 is an enlarged longitudinal section of the lower end of the solder reservoir, the valve plug and part of the point.
Figure 13:
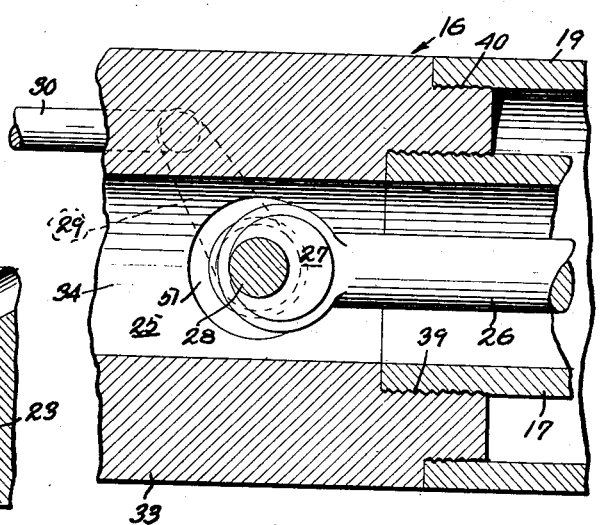
Fig. 13 is an enlarged longitudinal section showing the manner of mounting the eccentric in the main body of the soldering iron.
Figure 14:
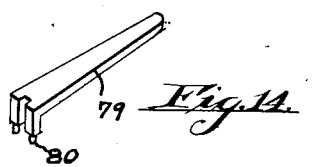
Fig. 14 is a detail perspective view of a wrench for use with the plug having the valve seat.

In Figs. 15 and 16 I illustrate a slight modification of the construction in which a different type of closure is utilized for the solder passage. In the construction of these figures I utilize a body structure of the iron 16 having the solder passage 32 therein and this body structure has a conical end 85 similar to that shown in Figs. 1 and 2, the passage terminating at the surface. In this case, however, it is unnecessary to use a tube in the passage.

A conical cap 86 is fitted on the conical surface 85 and has an aperture 87 therein. There is a knurled apex section 88 which is adapted to be gripped by the fingers to allow rotation of the cap 86 to bring the perforation 87 into alignment with the passage 32 and thus allow feeding of solder into the solder reservoir. A compression spring 89 bears against a washer 90 mounted on the tube forming the neck 14 and this spring presses the cap 86 tightly against the cone surface 85 of the body structure 16. The tube forming the neck has a series of fins or veins 91 formed of rings pressed thereon or else of a tube having fins pressed on the tube 14 and a heat disseminating plate 92 is also mounted on the tube 14. This may have a series of perforations as illustrated in connection with Figures 1 and 2 and also may have a notch similar to the notch 65 of Fig. 3. The handle preferably has a ferrule 93 at the end and also a nut 59 similar to that shown in Fig. 2. This nut is threaded on the end of the tube 14 forming the neck, the tube being secured in the handle in any suitable manner. The remaining portions of the iron are the same as described in connection with the other construction.

In Fig. 17 I show a modified construction of soldering point in which the point 95 is slightly reduced in size from that shown in Fig. 2 and has an outwardly extending flange 96. A flange screw 97 is threaded in the nut 20; the screw bearing against the flange 96 and seating this against the plug 21. This construction allows ready assembling and dismantling of the point.

Various changes may be made in the principles of my invention without departing from the spirit thereof as set forth in the description, drawings and claims.

I claim:

1. A soldering iron comprising in combination a body structure having a passage therethrough, a tube connected to the body structure, a nut connected to the opposite end of the tube, a soldering point connected to the nut and having a duct, a valve structure having a valve plug in the nut with a valve seat and a passage registering with the said duct, a valve stem extending longitudinally through the tube, an electric heating unit between the valve body and the nut surrounding the tube, means to operate the valve stem, a transverse connection through the body structure to operate the stem, and means on the outside of the body structure to operate said connecting means.

2. A soldering iron comprising in combination a body structure having a passage therethrough, a tube connected to the body structure at one end, a nut connected to the other end of the tube, a soldering point having a duct connected to the nut, a valve plug having a valve seat threaded in the nut and having a passage registering with the duct, an electric heating element surrounding the tube between the body structure and the nut, a stem to bear on the seat, a shaft extending transversely through the body structure and operatively connected to the stem to operate same, means on the outside of the body structure to operate the shaft and a solder feeding passage through the body structure above the said shaft.

3. In a soldering iron, the combination of a structure forming a solder receptacle, a valve having a valve seat with a discharge passage, said seat being raised above the bottom of the reservoir, a stem having a rounded lower end adapted to bear against the said seat, and means to operate said stem.

4. In a soldering iron, the combination of a structure forming a solder receptacle having a soldering point with a duct at the lower end, a structure forming a valve seat with a passage leading to the said duct, the seat being raised above the bottom of the reservoir and being rounded on the top, a valve stem extending through the reservoir having a spherical-shaped lower end to bear on the seat, an operating means for the stem extending outwardly sideways from the reservoir and means on the outside of the structure to operate the stem.

5. In a soldering iron, a structure forming a solder receptacle with a discharge valve plug at its lower end having a valve seat with a passage therefrom, a detachable valve point with a duct connected to said passage, a valve stem extending through the reservoir, an electric heating unit surrounding the reservoir, a cam shaft having one part journaled in a bushing and extending outwardly, the cam on the shaft engaging the stem, and means on the outside of the structure to operate the said shaft.

6. In a soldering iron, the combination of a body structure having a solder reservoir connected thereto and a passage to such reservoir, such body structure having a conical surface, a conical cap rotatably mounted thereon, the cap having a perforation to align with the said passage, a neck connected to the body portion and a spring on the neck pressing the cap against the said conical surface of the body portion.

7. In a soldering iron, the combination of a body structure having a solder reservoir, a handle, a neck connecting the handle and the body portion, a supporting plate, a valve for the reservoir having an internal stem, and means to operate said stem outside of the body portion with an operative device extending through the plate to the handle.

8. In a soldering iron, the combination of a body structure having a solder reservoir connected thereto, said body structure having a passage for the reservoir with an opening through a conical surface, a conical cap rotatably mounted on said surface and having a perforation to align with a passage, a neck connected with the body portion, a handle connected to the neck, the neck having a spring mounted thereon bearing against the cap, a plurality of fins on the neck, the spring bearing against the fins.

9. In a soldering iron, the combination of a body structure having a solder reservoir connected thereto and a passage to such reservoir, said body having a conical surface, a conical cap rotatably mounted thereon, such cap having a perforation to align with the said passage, a neck connected to the body structure and having a plurality of transverse fins thereon, a spring coiled on the neck and bearing against the cap and the said fins and retaining the said cap against the said conical surface.

10. In a soldering iron, the combination of a body structure having a solder reservoir connected thereto, a passage to such reservoir, the body structure having a conical surface, a conical cap rotatably mounted thereon and having a perforation to align with said passage, a handle, a neck connecting the handle and the body structure, a spring bearing against part of the neck and the conical structure, the body structure at the end of the reservoir having a soldering point with a valve seat having a duct leading through the point, a shiftable valve stem forming a closure for the valve seat, a shaft extending through the body structure and operatively connected to the said stem, a link connected to said shaft, and an operating device positioned adjacent the handle to operate said link, the link passing outside of the said conical cap.

11. In a soldering iron as claimed in claim 10, the neck having a plate attached thereto in a plane at right angles to the neck and having a part to form a stand to engage a table and support the soldering iron with the reservoir having a downward inclination, the said link passing through said plate and being guided therein.

12. In a soldering iron, the combination of a body structure having a solder reservoir with a solder point having a discharge duct and a valve to discharge solder to such duct, a handle, a neck portion connecting the handle and the body structure, a plate secured transversely to the neck and having means to engage a table and prevent rotation of the iron and supporting the iron with the reservoir at a downward inclination.

13. In a soldering iron as claimed in claim 12, the valve having a stem extending through the reservoir with an operating means extending outwardly through the body structure, a link to operate said means, said link having a support and bearing in the said plate.

14. In a soldering iron, the combination of a body structure having a solder reservoir with a solder point having a discharge duct and a valve to discharge into said duct, a handle, a neck connecting the handle and the body structure, a plate mounted on the handle transverse thereto and having a portion to engage a table and to prevent rotation of the iron and support the iron with the reservoir at a downward inclination, fins mounted on the neck, and a slidable link having a connection through the body structure to operate the valve, said link having a support and bearing in the said plate.

15. In a soldering iron as claimed in claim 14, the body structure having a conical surface with a passage therethrough to the reservoir, a conical cap rotatably mounted on such surface and having a perforation to align with the passage, and a spring bearing against the fins to force the cap against the said conical surface.

16. In a soldering iron, the combination of a cylindrical body structure having a solder reservoir therein with electrical means to heat the solder in such reservoir, a solder point having a discharge duct with a valve to control the flow of solder to such duct, a valve stem extending through the body structure at the upper end of the reservoir, there being a passage in the body structure to the upper end of the reservoir from one side portion, a rotatable cap having a perforation to align with the said passage or the cap forming a closure for such passage, a handle, a neck connecting the handle and the body structure, a supporting plate on the neck, and a link having a mounting in said plate and connected to the said shaft with a finger portion adjacent the handle to operate said link.

17. In a soldering iron, the combination of a body structure having a solder reservoir connected thereto, a passage to such reservoir, a cap rotatably mounted on the body structure and having a perforation to align with the said passage, said cap forming a closure for said passage, and a spring means to force the cap into close contact with the body structure.

18. In a soldering iron, the combination of a body structure having a solder reservoir with a discharge valve at the lower end, a handle, a neck between the handle and the body structure having a transverse plate thereon adapted to form a support for the iron with the reservoir inclined downwardly, a link having a mounting in said plate and having a finger piece, and a connection from said link to operate the said valve.

19. In a soldering iron, the combination of a body structure having a solder reservoir with a discharge valve at the lower end having a valve seat with an annular depression surrounding said seat adapted for the settling of the dross of the solder, and a valve stem extending longitudinally of the reservoir and forming a closure for the said seat.

20. In a soldering iron having a solder reservoir and a discharge valve having a raised valve seat with an annular depression surrounding said seat for the collection of dross from the solder, a stem having a rounded lower end to bear on the said seat, and means to operate said stem in a combined longitudinal and rocking motion to open and close said valve.

21. In a soldering iron having an inner tube forming a solder reservoir, a valve plug at the end of such tube having a passage therethrough with a raised valve seat, and an annular depression surrounding the seat for the collection of dross from the solder, a stem having a rounded end forming a closure on the seat for the said passage and means to operate said stem with a combined reciprocating and rocking motion.

22. In a soldering iron, the combination of an inner tube forming a solder reservoir, an outer tube, a valve plug having a solder passage with a raised valve seat and a surrounding annular depression for the collection of dross, a solder point having a duct, a nut interconnecting the inner and outer tubes, the plug, and the point, and a valve stem having a rounded end to bear on the seat, and means to operate said stem with a combined reciprocating and rocking motion.

23. In a soldering iron, the combination of an inner tube forming a solder reservoir, an outer tube, a solder point having a duct, a valve plug having a solder passage in alignment with the duct, a nut forming a connection between the lower ends of the inner and outer tubes, an electric heating element positioned between said tubes, the inner tube being connected to the inner part of the nut and the outer tube to an outer part, said plug being threaded in the nut internally, and the point being threaded internally of the nut on the same threads as the plug.

WILLIAM L. LOFTHOUSE.